US008620051B2

(12) United States Patent
Djerizi et al.

(10) Patent No.: US 8,620,051 B2
(45) Date of Patent: Dec. 31, 2013

(54) REGISTRATION OF OPTICAL IMAGES OF TURBID MEDIA

(76) Inventors: Salim Djerizi, Montreal (CA); Niculae Mincu, Pointe-Claire (CA); Mario Khayat, Montreal (CA)

(*) Notice: Subject to any disclaimer, the term of this patent is extended or adjusted under 35 U.S.C. 154(b) by 0 days.

(21) Appl. No.: 11/963,128

(22) Filed: Dec. 21, 2007

(65) Prior Publication Data

US 2010/0310181 A1   Dec. 9, 2010

Related U.S. Application Data

(60) Provisional application No. 60/871,769, filed on Dec. 22, 2006, provisional application No. 60/871,770, filed on Dec. 22, 2006.

(51) Int. Cl.
G06K 9/00 (2006.01)
G01B 9/00 (2006.01)
A61B 5/05 (2006.01)

(52) U.S. Cl.
USPC ........... 382/131; 382/154; 382/308; 356/456; 600/425

(58) Field of Classification Search
USPC ......... 382/115, 206, 224, 274, 276, 308, 128, 382/130, 131, 154, 181, 190, 195, 305; 356/317, 457, 446, 458; 128/922; 250/459.1, 461.2; 600/476, 425, 407, 600/310, 322
See application file for complete search history.

(56) References Cited

U.S. PATENT DOCUMENTS

| | | | | |
|---|---|---|---|---|
| 5,813,988 A * | 9/1998 | Alfano et al. | ................. | 600/476 |
| 5,917,190 A * | 6/1999 | Yodh et al. | ................. | 250/458.1 |
| 6,076,010 A * | 6/2000 | Boas et al. | ..................... | 600/477 |
| 6,415,172 B1 * | 7/2002 | Painchaud et al. | ............ | 600/407 |
| 6,473,141 B2 * | 10/2002 | Moseley et al. | ................. | 349/15 |
| 6,665,557 B1 * | 12/2003 | Alfano et al. | .................. | 600/473 |
| 7,034,303 B2 * | 4/2006 | Schotland et al. | ......... | 250/341.1 |
| 7,187,810 B2 * | 3/2007 | Clune et al. | ................... | 382/294 |
| 7,366,564 B2 * | 4/2008 | Szu et al. | ...................... | 600/473 |
| 7,965,389 B2 * | 6/2011 | Da Silva et al. | ............... | 356/317 |
| 2003/0038945 A1 * | 2/2003 | Mahner | ......................... | 356/457 |
| 2003/0065268 A1 * | 4/2003 | Chen et al. | .................... | 600/473 |
| 2004/0087861 A1 * | 5/2004 | Jiang | ............................. | 600/473 |
| 2004/0165081 A1 * | 8/2004 | Shibaki et al. | .............. | 348/222.1 |
| 2004/0170309 A1 * | 9/2004 | Hughes et al. | ................ | 382/128 |
| 2004/0181375 A1 * | 9/2004 | Szu et al. | .......................... | 703/2 |
| 2007/0081706 A1 * | 4/2007 | Zhou et al. | .................... | 382/128 |

(Continued)

OTHER PUBLICATIONS

Astrom et al. "Motion Estimation In Image Sequences Using the Deformation of Other Contours" IEEE Transactions on Pattern Analysis and Machine Intelligence vol. 21, No. 2 Feb. 1999, pp. 1-14.*

(Continued)

*Primary Examiner* — Chan S Park
*Assistant Examiner* — Mia M Thomas

(57) ABSTRACT

A co-registration system provides a means for spatially warping an optical image of an object with another images of a similar object. The optical image may be a scatter image, and the second image may be the same type of image modality, or may be different. The co-registration may use landmarks selected by a user, or may make use of contour information derived from the images. The system may also include processing of three-dimensional volume data in the form of sets of two-dimensional slices for co-registration.

16 Claims, 5 Drawing Sheets

(56) References Cited

U.S. PATENT DOCUMENTS

| | | | |
|---|---|---|---|
| 2007/0238957 A1* | 10/2007 | Yared | 600/407 |
| 2008/0024753 A1* | 1/2008 | Gladnick et al. | 356/3.01 |
| 2008/0139920 A1* | 6/2008 | Biglieri et al. | 600/410 |
| 2008/0218727 A1* | 9/2008 | Djeziri et al. | 356/2 |
| 2008/0238856 A1* | 10/2008 | Bhowmik et al. | 345/102 |
| 2008/0258048 A1* | 10/2008 | Leijssen et al. | 250/214 L |
| 2008/0294591 A1* | 11/2008 | Bredno | 707/1 |
| 2009/0069695 A1* | 3/2009 | Nielsen et al. | 600/473 |
| 2009/0184259 A1* | 7/2009 | Ma et al. | 250/483.1 |
| 2009/0240138 A1* | 9/2009 | Yi | 600/425 |
| 2010/0027018 A1* | 2/2010 | Bakker et al. | 356/446 |
| 2010/0078576 A1* | 4/2010 | Ntziachristos et al. | 250/459.1 |
| 2010/0111386 A1* | 5/2010 | El-Baz | 382/128 |
| 2011/0013819 A1* | 1/2011 | Raundahl et al. | 382/132 |
| 2011/0141520 A1* | 6/2011 | Kobayashi et al. | 358/1.15 |
| 2011/0142320 A1* | 6/2011 | Gupta et al. | 382/131 |
| 2011/0176710 A1* | 7/2011 | Mattiuzzi et al. | 382/128 |

OTHER PUBLICATIONS

Bissonnette et al. "Digital Breast Tomosynthesis Using an Amorphous Selnium Flat Planel Detector" Medical Imaging 2005: Physics of Medical Imaging Proc. of SPIE vol. 5745 pp. 1-12.*

Carney et al. "Method for transforming CT Images for attenuation correction in PET/CT imaging" Med. Phys. 33(4) Apr. 2006, pp. 1-8.*

Nunes et al. "Contrast Enhancements in Dense Breast Images Using the Modulation Transfer Function" Med. Phys 29(12) Dec. 2002, pp. 1-12.*

Mohapatra et al. "Transfer function measurement and analysis for magnetic resonance imager" Med. Phys 18(6) Nov./Dec. 1991 pp. 1-4.*

Kappadath et al. "Dual Energy digitial mammography for calcification imaging: Scatter and nonuniformity corrections" Med Phys. 32(11) Nov. 2005, pp. 1-14.* dos Santos Romualdo et al. "Mammography Images Restoration by Quantom Noise Reduction and Inverse MTF Filtering." XXII Brazilian Symposium on Computer Graphics and Image Processing IEEE (2009) pp. 1-6.*

Bligio et al. "Diagnosis of Breast Cancer using Elastic Scattering spectroscopy: preliminary clinical results" Journal of Biomedical Optics 5(2) 221-228 Apr. 2000.*

Rutherford et al. "An Interactive Approach to Photon Propagation in Turbid Media" Laser Physics, Vo. 13, No. 1 (2003) pp. 126-136.*

Wirth et al., A model for nonrigid mammogram registration using mutual information, Department of Computing and Information Science, University of Guelph, 6th International Workshop on Digital Mammography, Bremen Germany, 2002, pp. 243-245.

Zuo et al., Automatic Motion Correction for Breast MR Imaging, Department of Radiological Sciences, Deacones Hospital, vol. 198, No. 3, 1996, pp. 903-906.

Piron et al., A System for Accurate Co-registration of MRI and US Breast Images, Proc. Intl. Soc. Mag. Reson. Med. 10 (2002).

Coman et al., Finite-element method for intermodality nonrigid breast registration using external skin markers, Medical Imaging 2004, Proc. of SPIE vol. 5370, pp. 1152-1155.

Bergman et al., Technique to obtain positron emission mammography images in registration with x-ray mammograms, Med. Phys. 25 (11), Nov. 1998, pp. 2119-2129.

Zhang et al., Coregistered tomographic x-ray and optical breast imaging: initial results, Journal of Biomedical Optics, Mar./Apr. 2005, vol. 10(2), pp. 024033-1-024033-9.

Hosseini et al., Integration of Vibro-Acoustography Imaging Modality with the Traditional Mammography, International Journal of Biomedical Imaging, vol. 2007, Article ID 40980, 8 pages.

Azar et al., Standardized platform for coregistration of noncurrent diffuse optical and magnetic resonance breast images obtained in different geometries, Journal of Biomedical Optics, Sep./Oct. 2007, vol. 12(5), pp. 051902-1-051902-14.

Pu et al., An ellipse-fitting based method for efficient registration of breast masses on two mammographic views, Med Phys. Feb. 2008, vol. 35(2). pp. 487-494.

* cited by examiner

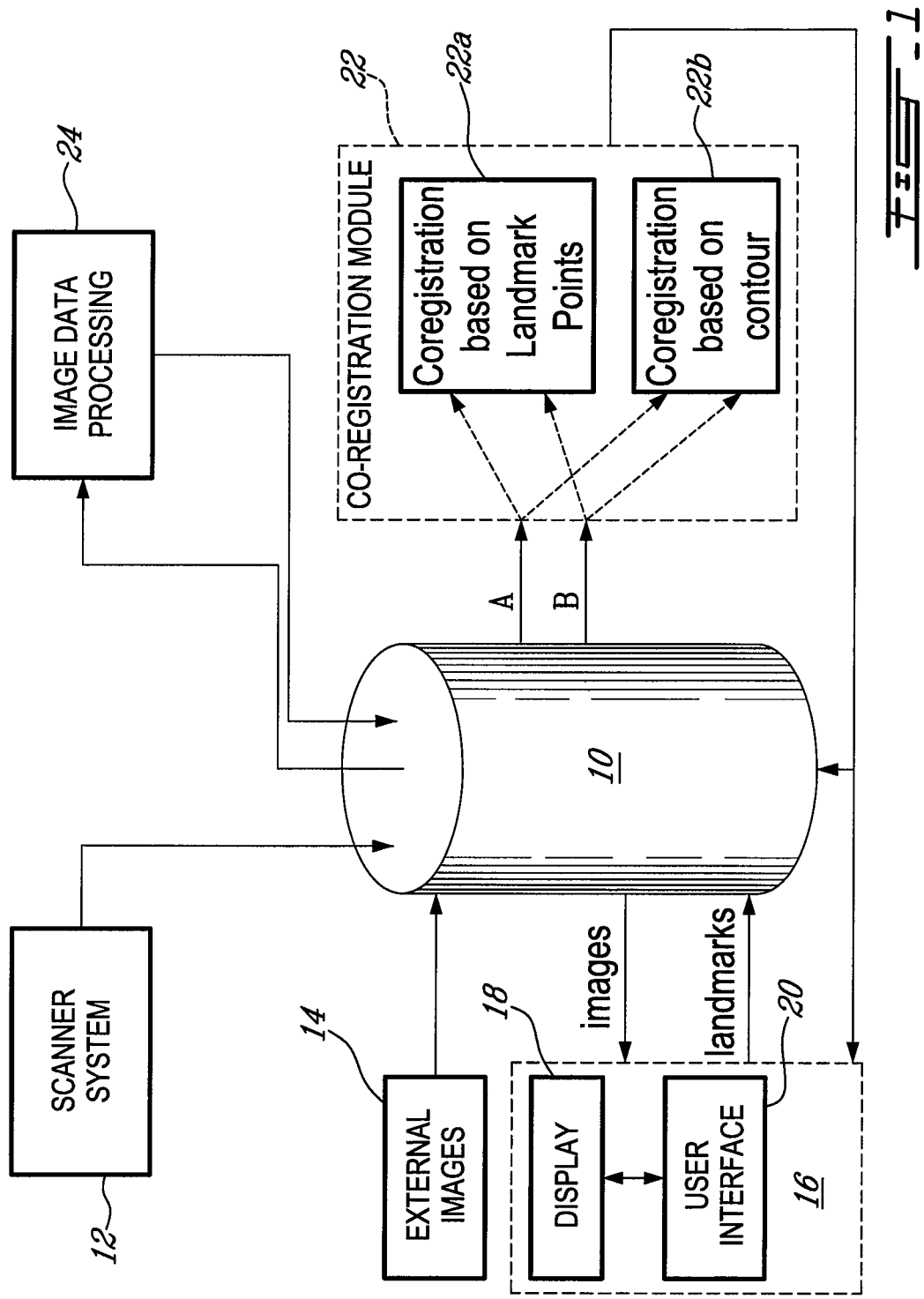

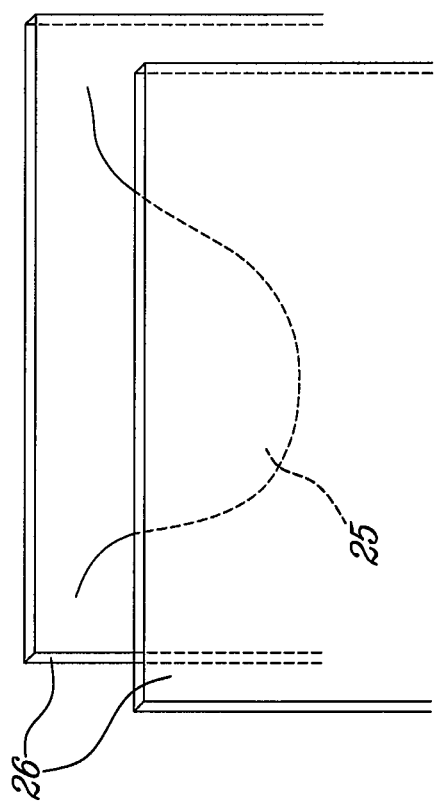
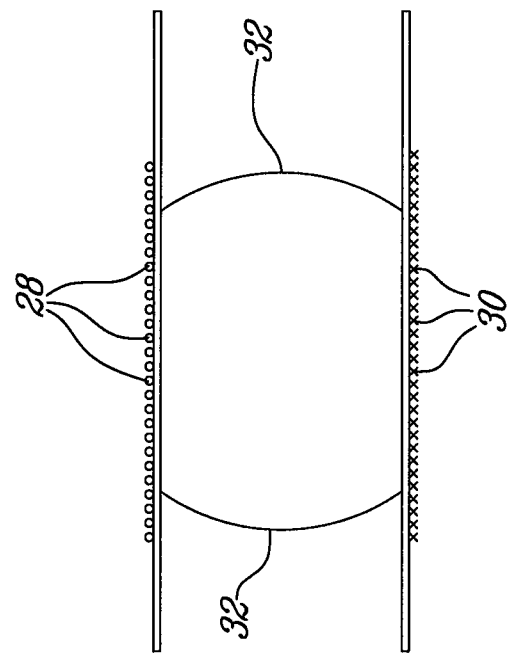

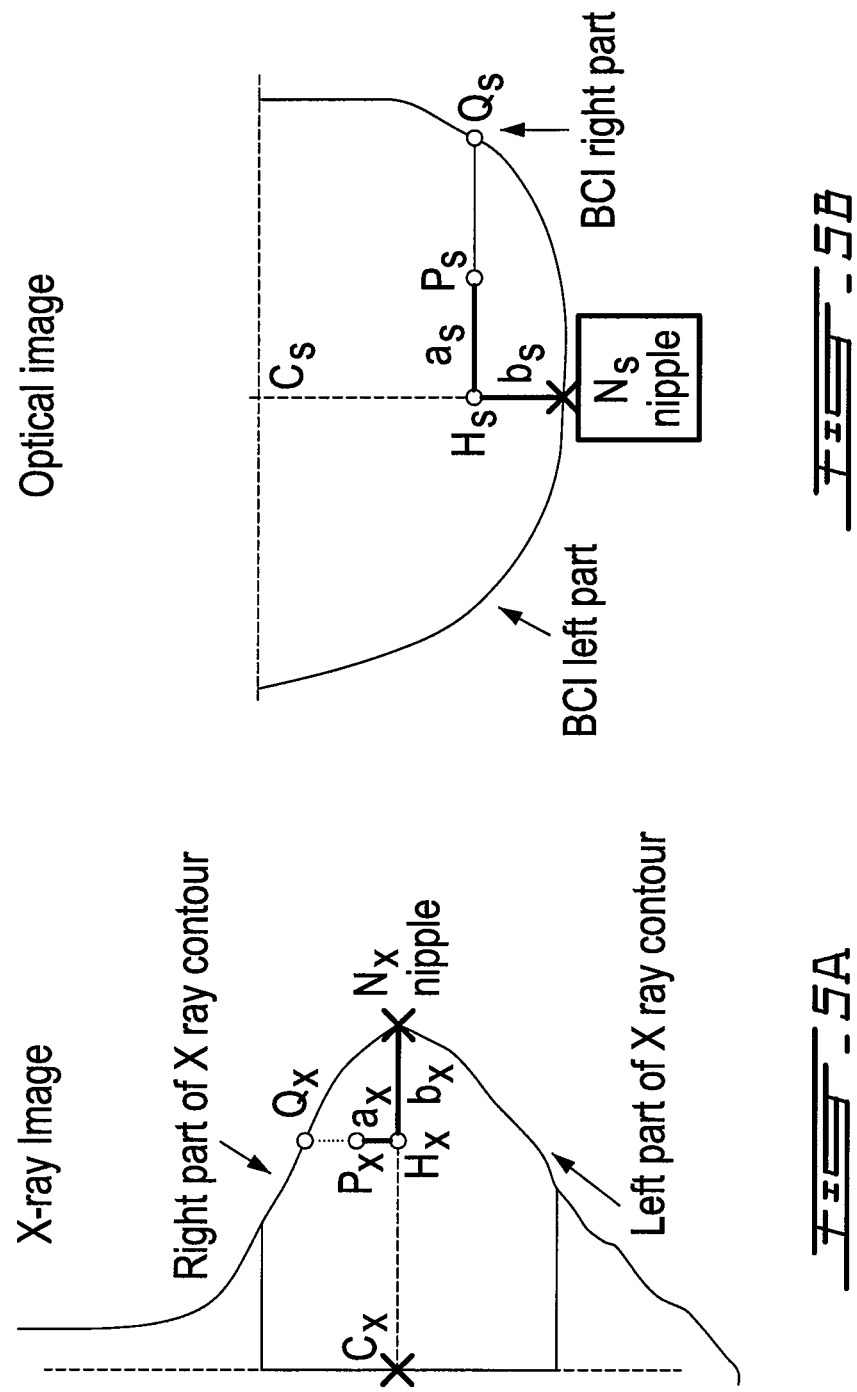

REGISTRATION OF OPTICAL IMAGES OF TURBID MEDIA

FIELD OF THE INVENTION

This application relates to optical imaging of turbid media such as breast tissue that is to be combined or used with other optical imaging of the same media.

BACKGROUND OF THE INVENTION

Optical imaging can provide valuable information about turbid media such biological tissue. Recent developments in both hardware and software enable rapid acquisition and processing of optical data to generate optical images of tissues. The use of optical imaging of living tissue, such as breast, brain or whole body of small animals, is growing within the medical and pharmaceutical research communities. Its advantages over other imaging modalities, such as X-ray, ultrasound, PET or SPECT and MRI, is that it can provide rich optical spectrum analytical information about tissue composition and that the imaging is done using non-ionizing radiation (i.e. light) without any adverse effect on tissue. For example, chromophore information can help discern between oxygenated and deoxygenated blood that is quite useful to understand the function within the tissue. In some cases, an exogenous marker, whether fluorescent or a chromophore, may be injected into the tissue to aid in localizing or visualizing objects of interest. Markers can selectively attach to certain molecules within tissue and the concentration of a marker within tissue can reveal important information about the state of the tissue.

Because tissue is a turbid medium, namely it scatters light heavily, optical imaging is a challenge. Optical scatter in tissue largely results from changes in the index of refraction caused by cellular and intracellular boundaries. Injected light thus becomes a diffuse glow when detected either at the other side of the tissue in transmission mode or at the same side of the tissue in reflection mode. In the imaging process, scattering of light within the tissue must be accounted for correctly if imaging with good spatial resolution is to be achieved. When light is injected into tissue, it is scattered and absorbed. The combination of the scattering and absorption of the light provides the overall attenuation of light between source and detector. In the case of a fluorophore, the absorbed light may be reemitted at a wavelength and time that varies as a function of the fluorophore properties.

Optical scatter, namely the density and level of contrast of index of refraction boundaries within tissue, is generally a source of structural information. However, since the absorption and/or the fluorescent reemission is a source of biological information of interest that is not obtainable with X-ray imaging, and since the location within the tissue of this biological information is to be identified, optical scatter is determined within the imaging process to allow for proper spatial identification of concentration of fluorophore and/or chromophore concentrations. Generally, scatter information is obtained by acquiring time dependent optical information, namely through time domain or frequency domain optical data acquisition.

SUMMARY OF THE INVENTION

In accordance with the present invention, a system and method are provided for performing a co-registration between a first image of an object derived from optical scanning and a second image of an object derived from optical scanning or some other scanning modality. The co-registration uses certain features that are identified in each of the two images. The term co-registration referred to herein, means a warping function that assigns points of an image to points of another image in a realistic way, i.e., such that features in one image corresponds to the same features in the other image. The two images may be images of different, but similar, regions of tissue, or they may be the same region of tissue imaged at different times.

The co-registration system includes a database in which image data is stored. A user interface is provided by which a user may view the images and identify relevant points in each image. A co-registration module uses the image data and the identified points to co-register the images, and to provide an output indicative of a result of the co-registration.

In a first embodiment of the invention, the co-registration module uses landmarks in the images themselves to build the correspondence between the two images. The landmarks may be selected by the user and identified via the user interface, and may be notable features of the object that are visible in the images, such as specific optical scatter patterns in a scatter image. The landmarks may also be selected automatically from components of the images based on predetermined selection criteria. The landmarks may be changed or deleted after viewing of the co-registration module output, and additional multiple sets of landmarks may be stored for the same two images.

In a second embodiment of the invention, the co-registration module uses contour data derived from the images. In one example, the contour represents an outer surface of the object. When using image data from an optical imaging system that immerses the object in an optical matching fluid, a first image of the object may be taken of the object in the absence of the matching fluid. This provides an image with a clearer indication of the contour. The contour may be determined automatically, or with the assistance of a user via the user interface. The co-registration module thereafter co-registers the images using the contour data.

The system may also include an image data processing module that operates on three-dimensional image data to produce two-dimensional images. The module slices the data volume along parallel planes to create sets of two-dimensional image planes that each represent an image volume. The co-registration may thereafter proceed by operating on each slice of a volume.

In one variation of the invention, an optical image represents absorption data from a scan of an object, that is, a distribution of an absorption coefficient. In another variation, the image may include data regarding luminescence from fluorescent or phosphorescent regions of the object.

In one particular use of the invention, the imaged object may be a human breast. In such a use, an optical image may be registered with an optical image of a different breast, or with an optical image of the same breast taken at a different time. An optical image of the breast may also be registered with an image of the breast acquired using another modality, such as X-ray.

BRIEF DESCRIPTION OF THE DRAWINGS

The invention will be better understood by way of the following detailed description with reference to the appended drawings in which:

FIG. 1 is a schematic block diagram of an optical image co-registration system;

FIGS. 4A and 4B are a side view and a top view, respectively, of a patient's breast positioned in an optical scanner that may be used with the system of FIG. 1; and FIGS. 5A and 5B are schematic depictions, respectively, of a contour taken from an X-ray image and a contour taken from an optical image for use with the system of FIG. 1.

DETAILED DESCRIPTION OF THE INVENTION

Figure 2A:
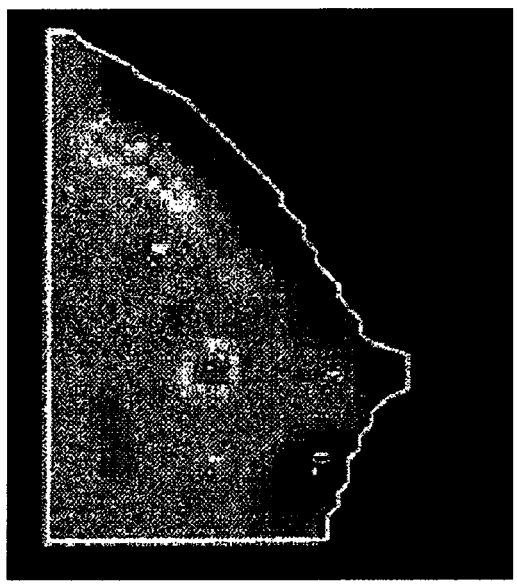
FIGS. 2A and 2B depict a first set of comparative optical images showing a set of fiducial markers as used with the system of FIG. 1.

Shown in FIG. 1 is a schematic block diagram of a system that may be used for performing a co-registration of two images. The system comprises a database 10 that contains image data, both in raw form and after being processed. In this embodiment, the source of the raw data is scanner system 12. The scanner system is an optical imaging system such as the optical breast imaging system sold under the name SOFT-SCAN® by ART Advanced Research Technologies Inc., St-Laurent, QC, Canada. However, those skilled in the art will recognize that the scanner system may be any of a number of different types of optical image systems. Also stored in the database 10 are image data from external image sources 14, such as X-ray images, ultrasound images, or optical images from other sources. In addition, the database may store landmark and contour points provided via a user console 16 that includes a display 18 and a user interface 20. If the database is storing information regarding scans of human patients, the data may be categorized by patient and by scan, as one patient may have different sets of data from scans that occurred at different times. Of course, the system is equally applicable to the co-registration of scans from non-human tissue.

The console 16 allows a user to view images stored in the database 10 and select landmarks or contour points to be used subsequently during co-registration. Such landmark or contour points may be defined by a user viewing maps of the optical parameters, such as the modified scattering coefficient, that result from a scan. Previous co-registration results may also be viewed by a user who thereafter modifies the landmark or contour points selected. The user may store the selected landmark or contour information in the database as part of the data belonging to a selected scan. The interface also allows the storing of more than one set of selected points for a particular image, as well as the deleting and changing of sets of points.

The system of FIG. 1 operates on optical image data, and does co-registration of that image data with the data from other optical images, or from images generated by other modalities, such as X-ray. Likewise, images of fluorophore concentrations, generated by detecting lifetimes of specific fluorophores, may be co-registered. The processing of the raw optical data into an image may be performed by the scanning equipment, such as that of the system mentioned above, and the co-registration system of the present invention may operate as a subsystem, or as a separate standalone system, using image data from any source.

In operation, the co-registration system of FIG. 1 allows the user to select two sets of data, and perform co-registration between the data of the two sets. The co-registration makes use of a co-registration module 22 that computes spatial transformation based on selected landmark points or contour points. The module applies transformations to map each set of data into the other. The result of the co-registration may then be displayed to a user in different ways via display 18.

Figure 2B:
Figure 3B:
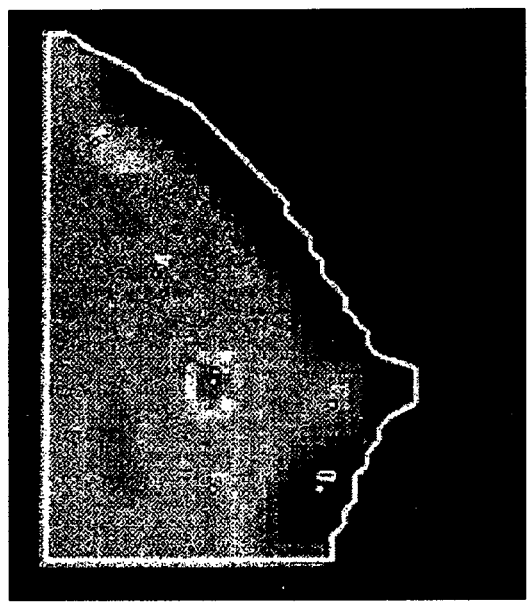
FIGS. 3A and 3B depict a second set of comparative optical images showing a set of fiducial markers as used with the system of FIG. 1.
Figure 3A:
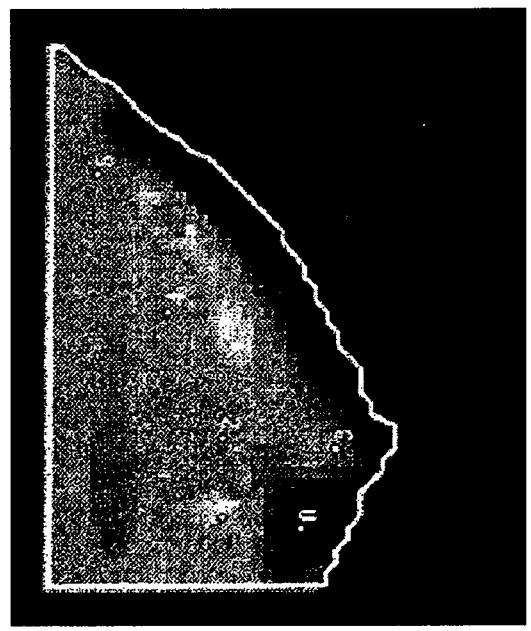

One embodiment of the invention allows the co-registration of images using landmark points in the images that are selected by a user based on a visual inspection of the images. FIGS. 2A and 2B and FIGS. 3A and 3B, show comparative optical images of the two breasts of a human patient. FIGS. 2A and 2B show the right and left breasts, respectively, imaged on a first occasion. FIGS. 3A and 3B show the same two breasts imaged at another time. These images are scatter images (i.e., based on the reduced scattering coefficient $\mu_s'$ for a specific wavelength) and, in each of the figures, landmarks are indicated, and have been numbered from 0 to 5. These landmarks are selected by a user via interface 18 after viewing the images on display 18 (FIG. 1). In this type of breast imaging, the compression of the breast, the angle of planar compression and the water retention of the breast tissue are all factors that can cause the image of the same breast to change over a short period of time between image acquisitions.

In some optical images, such as scatter images, patterns inherent to the physiological structures of the breast are very noticeable. These structures may be different from breast to breast but tend to be consistent in multiple images for the same breast. The patterns can therefore be used to monitor the evolution of the breast over time and to evaluate, for example, how a diseased breast reacts to a chemical therapy. The present invention recognizes structural patterns such as these and uses them as markers for co-registration.

An example of how a set of breast images may be analyzed for the purpose of co-registration is described below. In this example, the breast is scanned to provide a set of raw signal data (referred to as images) using an imaging system such as the SOFTSCAN® system described above. In taking these images, the breast is compressed between two parallel plates. The three-dimensional image volumes are thereafter processed using image data processing module 24. The structure in each of the patient's two breast images is defined by a set of N landmark points. In particular, the volumes of the three-dimensional images are sliced along Z-axis, perpendicular to the parallel plates compressing the breast, producing a set of effectively two-dimensional slices for each volume. The module 24 may also process multiple three-dimensional image volumes for the same scan, where each of the volumes corresponds to a different optical wavelength used during the scan. In such a case, a different set of image slices for each of the different wavelengths may be generated. Slices may also be individually processed for different optical properties (e.g., absorption and scattering) or for different physiological indices. The processed data is returned from module 24 to the database 10, where it is stored.

The image data from two images, A and B, are made available to the co-registration module 22 from the database 10. In this embodiment, the module performs a co-registration based on landmark points, as indicated at 22a. For a given optical index, such as the scattering index, a particular slice of the reconstructed volume of the breast is considered, the two-dimensional image data sets each corresponding to one of the three-dimensional images A and B. P and Q are used to represent the sets of marker points defining structures in the two-dimensional images A and B, respectively, and may be represented as follows:

$$P = \{(x_1^a, y_1^a), (x_2^a, y_2^a), \ldots, (x_N^a, y_N^a)\}$$

$$Q = \{(x_1^b, y_1^b), (x_2^b, y_2^b), \ldots, (x_N^b, y_N^b)\}$$

The co-registration of the two images can be expressed formally by finding two functions $f$ and its inverse $f^{-1}$, such that:

$$(x^a, y^a) = f(x^b, y^b) \text{ and inversely } (x^b, y^b) = f^{-1}(x^a, y^a)$$

where $(x^a, y^a)$ and $(x^b, y^b)$ denote the coordinates of a point in image A and a point in image B respectively in such a way that, for any point of P and Q, $$f(x_k^b, y_k^b) \in P \text{ and } f^{-1}(x_k^a, y_k^a) \in Q, \text{ with } k = 1 \ldots N.$$

The manner in which computing functions $f$ and $f^1$ are derived depends on the number N. A minimum of three points will be used to do the co-registration, and the higher the number N, the more accurate the co-registration. The following table shows the type of well-known functions that may be determined for a given minimum value for N.

| Minimum N | Type of function |
|---|---|
| 3 | 'affine'<br>[u v] = [x y 1] * T<br>T is a 3-by-2 matrix and is obtained by solving the linear system of equations. |
| 6 | 'Local Weighted Mean'<br>The method is described in paper: Goshtasby, Ardeshir, "Image registration by local approximation methods," Image and Vision Computing, Vol. 6, 1988, pp. 255-261 |

This co-registration technique is extended to the three-dimensional volume by applying the same geometrical transformation to each slice of the volume after repositioning the set of markers on the structures. The first and the last slices may be ignored. The output of the co-registration module 22 may be stored in the database 10 and/or provided to the user interface 16. The data output by the co-registration module may include look-up tables for warping image A to image B, and vice versa.

It will be appreciated that once the optical scatter property image has been registered with another image, an image of the absorption coefficient distribution is also registered since the optical data acquisition intrinsically provides information regarding both the modified scatter coefficient and the absorption coefficient. Thus, once the registration of the images has been achieved with the scatter optical image, all the other optical images available from the study (optical properties or physiological indices) can be displayed in a registration mode, (i.e., after being warped).

The optical image may consist of a fluorescence image (meaning an image including either fluorescence or phosphorescence image data). The fluorescence (or "luminescence") image can be generated by endogenous or exogenous molecules excited with an energy source such as light of an appropriate wavelength. The fluorescent images may be obtained by using clinically approved fluorescent agents to tag specific tissue or tumors.

As mentioned above, the optical scatter image can be used to register another optical image of the same object taken at a different time. This is particularly advantageous when it is desired to follow the evolution of the state of the object over time. For example, it may be desirable to follow the progression of a tumor in a breast (or other tissue) following treatment of the tumor.

The displayed result of the registration of the images may take several forms. In one aspect, the optical image can be superimposed on the image obtained by a different modality (because it was co-registered with the other method based on contour). Alternatively one of the images can be displayed with image annotations identifying features from the other image. In yet another embodiment a report can be generated with a description of the characteristics of features and landmarks that have co-registered in the two images.

In addition to performing co-registration using landmarks, it is possible to perform co-registration using image contours. In this alternative embodiment, points along a contour from the optical image are used for co-registration with corresponding points from another image. The contour typically represents the edges of the object being imaged, which are clearly visible when using an image modality such as X-ray. However, in optical breast imaging, it may be more difficult to locate the breast contour.

Using the SOFTSCAN® system described above, a breast being examined may be positioned as is shown in FIGS. 4A and 4B (FIG. 4A being a side view and FIG. 4B being a top view). In this type of breast imaging, the breast is gently compressed between two plates 26. The plates are substantially parallel to each other to provide a rectangular geometry. One or more light sources 28 are coupled to one of the plates using, for example, optical fibers. Detectors 30 are positioned on the other plate, thereby allowing acquisition of an optical signal in a transmission mode. While the plates confer a generally rectangular shape to the object, it can be appreciated from the top view and the cross-sectional view that the edges 32 of the object are rounded, and not simple regular shapes.

For the purpose of breast imaging, a time domain multi-wavelength system having a slab geometry with the breast pendant in a rectangular tank surrounding by a scattering matching fluid can be used. In one embodiment, a single source with five associated detectors is raster scanned through the entire surface of the slab in increments of 3 mm. For each scan point, five detector positions are used in a transmission mode. For a source located at (0, 0, 0), the corresponding detector locations may be, for example, Detector 1: (−25 mm, 5 mm, 60 mm), Detector 2: (25, 5, 60), Detector 3: (0, 0, 60), Detector 4: (−25, −15, 60) and Detector 5: (25, −15, 60).

Because the matching fluid tends to obscure the contour of the breast in the resulting optical image, the source and a central detector are first used prior to filling the tank with the matching fluid. The source and detector are operated in a "quasi-continuous wave (CW) mode" and provide the desired "breast contour image" (BCI) data. This BCI data is stored in the database (FIG. 1) with the rest of the data. The BCI is done through a raster scan of horizontal movements of a source-detector. The source emits a signal that is collected by the detector, and the signal disappears at the edge of the breast. For that horizontal line of the scan, the system determines points where the signal disappears as corresponding to the intersection of edge breast with the horizontal line of the scan. The points (generally two points) are put in the set of points defining the contour. Subsequently, the horizontal line of the scan is shifted to a different horizontal line, and the process repeats.

For this embodiment of the invention, the system performs a co-registration based on contour, as indicated at 22b. The manner in which this co-registration is performed may be better understood from FIGS. 5A and 5B. FIG. 5A shows the relevant contour from an X-ray image, while FIG. 5B shows the relevant contour from a corresponding optical image. The co-registration function $P_S = f(P_X)$, where $P_S$ is a point in the optical image and $P_X$ is a point in the X-ray image is constructed in the following way:

a) First a user, who may be a radiologist or a physician, defines two points in the X-ray image. The two points selected in this example are: the nipple $N_X$ and the chestwall by point $C_X$. $N_X$ and $C_X$ are used to define a new reference axis in the X-ray image, as shown in FIG. 5A.
b) In the optical image, these two points are defined automatically. The nipple $N_S$ can be defined as the lowest point of the BCI. This rule is derived from the observation that, for this type of optical system, the woman is lying horizontally during the breast imaging scan and, thus, her breast is in a pendant position. The other point $C_S$ is defined as the intersection of a vertical line from $N_S$ to a horizontal line defined by the extremities of the BCI.
c) A correspondence is built between the left part of the BCI, defined from the nipple $N_S$ and the left part of the X-ray contour defined from the point $N_X$,
d) Another correspondence is built in a similar way between the right part of the BCI and the X-ray contour.
e) The ratio between the lengths of the medial axes will be used first to define the lengths of left and right parts of X-ray contour in the following way:

$$R = \frac{\|C_X - N_X\|}{\|C_S - N_S\|}$$

Right part of X-ray Contour=R*(Right part of the BCI).
Left part of X-ray Contour=R*(Left part of the BCI).
This constrains only a small part of X-ray image being in correspondence with the optical image. Points outside that region are not regarded by the co-registration process and do not have corresponding points in the optical image. Points in the right region in optical image correspond to points in the right region in X-ray image, and vice versa. The same applies for left regions.
f) Coordinates System: One may define $H_S$ as the projection of a point $P_S$ on the line defined by points $N_S C_S$ and $H_X$ as the projection of point $P_X$ on the line defined by points $N_S C_S$. Similarly, $Q_S$ is the intersection point between line HsPs and the left or right BCI part, depending on which side $P_S$ is on. In the same way, let $Q_X$ is the intersection point between line $H_X P_X$ and the left or right X-ray contour part, depending on which side $P_X$ is on. Then a point $P_S$ can be defined by its coordinates in the following way:

$$P_S = \begin{cases} a_s = \frac{\|P_S - H_S\|}{\|Q_S - H_S\|} \\ b_s = \frac{\|H_S - N_S\|}{\|C_S - N_S\|} \end{cases} \text{ where } 0 \le b_s \le 1 \text{ and } -1 \le a_s \le 1$$

In similar way a point in the X-ray image can be expressed as:

$$P_X = \begin{cases} a_X = \frac{\|P_X - H_X\|}{\|Q_X - H_X\|} \\ b_X = \frac{\|H_X - N_X\|}{\|C_X - N_X\|} \end{cases} \text{ where } 0 \le b_X \le 1 \text{ and } -1 \le a_X \le 1$$

g) The co-registration procedure consists of finding for any point in optical image $P_S$, a point $P_X$ in the X-ray image that has the exactly same coordinates based on the coordinate system described above.

h) Therefore in that system of coordinates, using the right part of the contour for both modalities, are the set of points having coordinates:

$$P = \begin{cases} a = 1 \\ B_1 \le b \le 1 \end{cases}$$

where boundary $B_1 \ge 0$. In a similar way, using the left part of the contour, there are the set of points $$P = \begin{cases} a = -1 \\ B_2 \le b \le 1 \end{cases}$$

where boundary $B_2 \ge 0$. For both modalities, the nipple has the coordinates $$\begin{cases} 0 \\ 0 \end{cases},$$

and the chest wall point has the coordinates $$\begin{cases} 0 \\ 1 \end{cases}.$$

This co-registration procedure ensures the following:
The nipple in the optical image corresponds to the nipple in the X-ray image and vice-versa.
The point $C_X$ corresponds to the point $C_S$.
Points lying in the segment line $N_X C_X$ are in correspondence with points of the segment $N_S C_S$
Points in the right part of the contour of the optical image are in correspondence with points lying in the right part of the X-ray contour. Likewise, similar correspondence exists for the left parts of BCI and the X-ray contour.
Points that are between the contour and the medial axis using one modality are in correspondence with points that are between the contour and medial axis using the other modality.

Generating an Optical Scattering Data Set.:
Light propagation in tissue is well modeled by the diffusion equation. In the time domain the mathematical expression modeling light propagation in a homogeneous medium is:

$$\frac{1}{v}\frac{\partial}{\partial t}\Phi(r,t) - D\nabla^2\Phi(r,t) + \mu_a\Phi(r,t) = S(r,t), \quad (1)$$

where $\Phi(r,t)$ is the photon flux, $D=1/3\mu'_s$ is the diffusion coefficient expressed with $\mu'_s$ being the scattering coefficient, $\mu_a$ is the linear absorption coefficient, v is the speed of light in the medium and s(r,t) is the source term (assumed to be a δ-function in our case). The temporal data acquired from a scan can be processed with diffuse optical spectroscopy (DOS) and diffuse optical tomography (DOT). Many studies have been dedicated to solving equation (1) for diverse geometries. Delfino et al. (Delfino et al. Appl. Opt. (1999); 38:4228-4236) suggested that, in the case of transmittance, the expression provided by Contini et al. (Contini et al.

Applied Optics (1997); 36:4587-4599) results in the most satisfactory agreement between experimental and theoretical predictions. In one embodiment of the present invention, the expression from Contini et al. can be used:

$$T(\rho, t) = \frac{\exp\left(-\mu_a vt - \frac{\rho^2}{4Dvt}\right)}{2(4\pi Dv)^{3/2}t^{5/2}} \sum_{m=-\infty}^{+\infty}\left[z_{1,m}\exp\left(-\frac{z_{1,m}^2}{4Dvt}\right) - z_{2,m}\exp\left(-\frac{z_{2,m}^2}{4Dvt}\right)\right], \quad (2)$$

where $T(\rho,t)$ represents the probability that a photon, entering the medium at t=0, exits at a time t and at a distance $\rho$ per unit of time and unit of area. $z_{1,m}$ and $z_{2,m}$ are expressed by:

$$\begin{cases} z_{1,m} = s(1-2m) - 4mz_e - z_o, \\ z_{2,m} = s(1-2m) - (4m-2)z_e + z_o \end{cases} m = (0, \pm 1, \pm 2, \ldots); z_o = \frac{1}{\mu_s'}, \quad (3)$$

and account for the boundary conditions.

The theoretical expression of equation (2) is used in an inverse problem to retrieve the bulk optical properties of the medium under investigation. For example, a least squares fit can be performed with three free parameters: the amplitude of the temporal point spread function (TPSF), the absorption coefficient and the scattering coefficient. The best fit can be reached iteratively with a Levenberg-Marquardt algorithm and minimization of a $\chi^2$ merit norm.

The absorption and scattering coefficients estimated through this procedure are related to the physiological and structural bulk properties of the biological tissue probed. The absorption coefficient is related to the different constituents of the breast through the linear contributions of the different tissue chromophores:

$$\mu_a(\lambda) = \sum_i^{NC} \varepsilon_i^\lambda C_i \quad (4)$$

where $\varepsilon$ is the wavelength dependent extinction coefficient of the $i^{th}$ chromophore and C its concentration. In the case of breast tissue, it is widely assumed that the primary NIR absorbers are oxyhemoglobin, deoxyhemoglobin, hemoglobin, water and lipids (denoted as $HbO_2$, Hb, $H_2O$ and Li respectively). $HbO_2$ and Hb can be combined to obtain blood volume (HbT) and blood oxygen saturation ($SaO_2$). It will be appreciated that other NIR chromophores (absorbers) can be present and that the composition of NIR chromophores may vary from tissue to tissue.

The scattering coefficient originates mainly from the refractive index micro-variations in tissue. It has been shown that a simple Mie-scattering approximation is applicable to scattering of breast tissue (Durduran et al. Phys Med Biol. (2002); 47:2847-2861):

$$\mu_s'(\lambda) = a\lambda^{-b} \quad (5)$$

where a is referred to as scattering amplitude and b as scattering power. These last parameters are related to the breast composition. Typically, large scatterers have lower a and b values, whereas small scatterers have higher a and b (Mourant et al. Appl. Opt. (1997); 36:949-957). Moreover, Cerrusi et al. (Cerussi, Acad. Radiology 2001; 8:211-218) show a linear relationship for both the lipid and water content to the scattering power. This relationship was established experimentally from a study based on 28 women and with a coefficient of determination $r^2$ of 0.84 for the lipid content and 0.85 for the water content. This relationship is expressed as:

$$[H_2O] = 0.35*b - 0.05(\%)$$

$$[Li] = -0.50*b + 0.90(\%) \quad (6)$$

The accuracy of the time resolved technique can be used to obtain absolute values of the scattering coefficient to estimate the lipid bulk concentrations from equation (6). Then the inverse problem expressed in equation (4) is reduced to three chromophores and hence far better conditioned. To solve equation (4) a non-negative least squares (NNLS) algorithm can be used. The initial value of the water concentration can be provided by equation (6) but set as a free parameter in the fitting algorithm.

It is also possible from multiple spatial measurements to estimate the local distribution of the absorption and scattering coefficients. The concept of this application is to employ measurements recorded from tissue using multiple optical source—detector pairs and retrieve (reconstruct) the object function by synthesizing the measurements through solution of an inverse problem (Arridge. Inverse problems (1999); 15: R41-R93).

One cost-efficient and robust approach to perform Diffuse Optical Tomography (DOT) is to solve the heterogeneous equation within the Rytov perturbative approach (O'Leary. PhD University of Pennsylvania 1996). In the case of time resolved measurements, there are potentially different types of data sets. One can select the $0^{th}$ moment (equivalent to continuous mode) and $1^{st}$ moment (mean time of photon arrival) of the TPSF (Arridge. Inverse problems (1999); 15:R41-R93). The DOT problem is thus expressed as:

$$\begin{bmatrix} \Phi_{sc}^{(I)}(r_{sd1}) \\ \vdots \\ \Phi_{sc}^{(I)}(r_{sdm}) \\ \Phi_{sc}^{(MT)}(r_{sd1}) \\ \vdots \\ \Phi_{sc}^{(MT)}(r_{sdm}) \end{bmatrix} = \begin{bmatrix} W_{11}^{(I)} & \ldots & W_{1n}^{(I)} \\ \vdots & \ddots & \vdots \\ W_{m1}^{(I)} & \ldots & W_{mn}^{(I)} \\ W_{11}^{(MT)} & \ldots & W_{1n}^{(MT)} \\ \vdots & \ddots & \vdots \\ W_{m1}^{(MT)} & \ldots & W_{mn}^{(MT)} \end{bmatrix} \begin{bmatrix} \delta\mu_a(r_1) \\ \vdots \\ \delta\mu_a(r_n) \end{bmatrix} \quad (7)$$

where $$\Phi_{sc}^{(I)}(r_{sdi}) = \ln\left(\frac{U(r_{sdi})}{U_0(r_{sdi})}\right)$$

is the $0^{th}$ moment Rytov pertubation, $\Phi_{sc}^{(MT)}{}_{sdi} = \bar{t}(r_{sdi}) - \bar{t}_0(r_{sdi})$ the $1^{st}$ moment Rytov perturbation, with $W_{ij}^{(I)}$ and $W_{ij}^{(MT)}$ the corresponding weight of the sensitivity matrix. The expressions for the weight functions are:

$$W_{ij}^{(I)} = \frac{1}{(4\pi D)^2 r_{sivj} r_{vjdi}} \cdot \exp\left[-\sqrt{\frac{\mu_a}{D}} \cdot (r_{sivj} + r_{vjdi})\right] \cdot \frac{1}{U_0(r_{sdi})} \quad (8)$$

$$W_{ij}^{(MT)} = \frac{(r_{sivj} + r_{vjdi})}{c \cdot \sqrt{\mu_a \cdot D}\,(4\pi D)^2 r_{sivj} r_{vjdi}} \cdot$$

$$\exp\left[-\sqrt{\frac{\mu_a}{D}} \cdot \begin{pmatrix} r_{sivj} + \\ r_{vjdi} \end{pmatrix}\right] \cdot \frac{1}{U_0(r_{sdi})} - \left(\frac{\bar{t}_0(r_{sdi}) \cdot W_{ij}^{(I)}}{U_0(r_{sdi})}\right)$$

with $r_{sivj}$ and $r_{vjdi}$, corresponding to the $i^{th}$ source-$j^{th}$ voxel and $j^{th}$ voxel-$i^{th}$ detector distances, respectively, and $U_0(r_{sdi})$ and $\bar{t}_0(r_{sdi})$ correspond to the homogeneous $0^{th}$ moment and $1^{st}$ moment of the TPSF for the considered source detector-pair.

It will be appreciated that other approaches can be used to derive the scatter "map" of an object as would be known by those skilled in the art.

While optical data acquisition has been described as applied to time domain (TD), it will be appreciated that frequency domain (FD) acquisition may also be used to recover optical parameters such as $\mu_a$ and $\mu_s'$. Algorithms for reconstruction in FD are well known in the art (Sevick-Muraca et al., Neoplasia 2: 388-417, 2000, incorporated herein by reference).

While the invention has been described in connection with specific embodiments thereof, it will be understood that it is capable of further modifications and this application is intended to cover any variations, uses, or adaptations of the invention following, in general, the principles of the invention and including such departures from the present disclosures as come within known or customary practice within the art to which the invention pertains and as may be applied to the essential features herein before set forth, and as follows in the scope of the appended claims.

The invention claimed is:

1. A system for providing co-registration between a first digital image of an object derived by means of diffuse photon propagation through the object and a second digital image of the object, the second digital image of the object having a configuration similar to a configuration of the first digital image of the object, the system comprising:
  a database for storing the first and second digital images of the object, wherein the first and second digital images of the object represent a same part of the object;
  a graphical user interface for allowing a user to:
    view the first and second digital images of the object,
    select N first data points of the object in the first digital image of the object for identifying N features of the object, and
    select in the second digital image of the object N second data points of the object, corresponding to the N first data points of the object, for identifying the N features of the object; and
  a co-registration module for enabling a spatial warping of one of the first and second digital images of the object with respect to the other one of the first and second digital images of the object by a compression or an extension of the first digital image of the object, along at least one axis defined by two or more of the N first data points, or by a compression or an extension of the second digital image of the object, along at least one axis defined by two or more of the N second data points, so that at least M of the N features of the object on the one of the first and second digital images of the object are mapped to corresponding at least M of the N features of the object on the other one of the first and second digital images of the object.

2. The system of claim 1, wherein the same part of the object correspond to slices of 3D images of the object.

3. The system of claim 1, wherein the graphical user interface further allows the user to select points along a contour of the object of the first and second images.

4. The system of claim 1, wherein the second image is a digital X-ray mammography image.

5. The system of claim 1, wherein the object is a human breast.

6. The system of claim 1, wherein the co-registration module is for defining a transform function for deriving data point coordinates of one of the first and second images from data point coordinates from another one of the first and second images.

7. The system of claim 6, wherein the co-registration module is for defining an inverse of the transform function for deriving data point coordinates of the first image from data point coordinates of the second image.

8. The system of claim 6, wherein the co-registration module is for applying the transform function to a plurality of image pairs, wherein each image pair comprises a third image derived from another diffuse photon propagation of the object in a plane parallel to the first image and a fourth image with a configuration similar to a configuration of the third image.

9. The system of claim 1, wherein the database is further for storing a spatially warped image.

10. The system of claim 1, comprising a display for showing a spatially warped image.

11. A method for providing co-registration between a first digital image of an object derived by means of diffuse photon propagation through the object and a second digital image of the object having a configuration similar to a configuration of the first image of the object, comprising:
  storing the first and second digital images of the object in a database, wherein the first and second digital images of the object represent a same part of the object;
  allowing a user to view the first and second digital images of the object, to select N first data points for identifying N features of the object, and to select in the second digital image of the object N second data points of the object, corresponding to the N first data points of the object, for identifying the N features of the object; and
  spatially warping one of the first and second images with respect to the other one of the first and second images by compressing or extending the first digital image of the object, along at least one axis defined by two or more of the N first data points, or by compressing or extending the second digital image of the object, along at least one axis defined by two or more of the N second data points, so that at least M of the N features of the object on the one of the first and second digital images of the object are mapped to corresponding at least M of the N features of the object on the other one of the first and second digital images of the object.

12. The system of claim 1, wherein the N first data points of the object and the N second data points of the object comprise landmark points of the object of the first and second images.

13. The system of claim 1, wherein the N first data points of the object and the N second data points of the object comprise contour data of the object of the first and second images.

14. The system of claim 1, wherein the co-registration module is configured to:
  define a first reference axis based on two of the N first data points identifying two of the N features of the object,
  define a second reference axis based on two of the N second data points identifying the two of the N features of the object,
  compute a ratio of a distance between the two first data points and a distance between the two second data points, and
  compress or extend the first digital image, along the first reference axis, or compress or extend the second digital images of the object, along the second reference axis, as a function of the ratio.

15. The system of claim 14, wherein:
the graphical user interface is configured to allow the user to select third and fourth first data points in the first digital image of the object and corresponding third and fourth second data points in the second digital image of the object for identifying third and fourth features of the object; and
the co-registration module is configured to define a third reference axis, perpendicular to the first reference axis, based on the third and on the fourth first data points and to define a fourth reference axis, perpendicular to the second reference axis, based on the third and on the fourth second data points.

16. The system of claim 15, wherein the co-registration module is configured to:
compute a first coordinate of the third feature of the object in the first image of the object as a fraction of a distance between the third first data point and a meeting point of the first and third reference axes over a distance between the fourth first data point and the meeting point of the first and third reference axes;
compute a second coordinate of the third feature of the object in the first image of the object as a fraction of a distance between one of the first data points and the meeting point of the first and third reference axes over the distance between the two first data points;
compute a first coordinate of the third feature of the object in the second image of the object as a fraction of a distance between the third first data point and a meeting point of the second and fourth reference axes over a distance between the fourth second data point and the meeting point of the second and fourth reference axes; and
compute a second coordinate of the third feature of the object in the second image of the object as a fraction of a distance between one of the second data points and the meeting point of the second and fourth reference axes over the distance between the two second data points.

* * * * *